United States Patent
Motomura et al.

(10) Patent No.: US 7,203,381 B2
(45) Date of Patent: Apr. 10, 2007

(54) IMAGE PROCESSING METHOD, IMAGE PROCESSING APPARATUS, AND IMAGE PROCESSING PROGRAM

(75) Inventors: Hideto Motomura, Nara (JP); Katsuhiro Kanamori, Nara (JP); Yoichi Miyake, Chiba (JP); Norimichi Tsumura, Chiba (JP); Toshiya Nakaguchi, Chiba (JP); Takashi Sugaya, Chiba (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 145 days.

(21) Appl. No.: 11/063,389

(22) Filed: Feb. 23, 2005

(65) Prior Publication Data

US 2005/0152619 A1 Jul. 14, 2005

Related U.S. Application Data

(63) Continuation of application No. PCT/JP04/19374, filed on Dec. 24, 2004.

(30) Foreign Application Priority Data

Jan. 9, 2004 (JP) ............................. 2004-003853
Mar. 30, 2004 (JP) ............................. 2004-100727

(51) Int. Cl.
*G06K 9/32* (2006.01)
*G06K 9/36* (2006.01)

(52) U.S. Cl. ..................... 382/299; 382/300; 382/280

(58) Field of Classification Search ........ 382/298–300, 382/279–280
See application file for complete search history.

(56) References Cited

U.S. PATENT DOCUMENTS 6,760,489 B1 * 7/2004 Kuwata ..................... 382/300
6,990,249 B2 * 1/2006 Nomura ..................... 382/254
7,085,436 B2 * 8/2006 Akhan et al. ............... 382/298

FOREIGN PATENT DOCUMENTS

| JP | 07-067031 | 3/1995 |
| JP | 10-069537 | 3/1998 |
| JP | 10-112843 A | 4/1998 |
| JP | 10/136317 | 5/1998 |
| JP | 08-294001 | 11/1998 |
| JP | 11-4413 A | 1/1999 |
| JP | 11-008838 | 1/1999 |
| JP | 2000-312294 A | 11/2000 |
| JP | 2003-018398 | 1/2003 |
| JP | 2003-18398 A | 1/2003 |

OTHER PUBLICATIONS

Shinji Araya, "Clear commentary on 3D computer graphics"; Kyoritsu Shuppan Co., Ltd.; pp. 144-145; Sep. 25, 2003; and a partial English translation thereof.

* cited by examiner

*Primary Examiner*—Matthew C. Bella
*Assistant Examiner*—Wes Tucker
(74) *Attorney, Agent, or Firm*—Harness, Dickey & Pierce, P.L.C.

(57) ABSTRACT

An image feature analysis section performs image feature analysis of an input image to generate an image feature quantity independent from image coordinates. An image content densification section information densifies the image feature quantity to generate a densified image feature quantity. An image generation section generates, based on the densified image feature quantity, an image in which the information content of the input image is densified.

10 Claims, 15 Drawing Sheets

IMAGE PROCESSING METHOD, IMAGE PROCESSING APPARATUS, AND IMAGE PROCESSING PROGRAM

CROSS REFERENCE TO RELATED APPLICATIONS

This is a continuation of Application PCT/JP2004/019374, filed on Dec. 24, 2004.

BACKGROUND OF THE INVENTION

1. Field of the Invention

The present invention relates to image processing for image measurement/recognition and image generation, and particularly relates to a technology for generating information densified images of which information contents are greater than those of the original images.

2. Description of the Related Art

In recent years, digitalization of various kinds of image processing equipment, video equipment, and the like, and widespread use of Internet lead to interconnection of computers and household electrical appliances, so that generally-called ubiquitous network society employing remote control, media merger, and the like has been being organized. The Specs of image equipment are wide-ranged due to difference in mechanism, portability, function, and the like, and therefore, image information in various formats is distributed. In a one-segment terrestrial digital broadcast for mobile phones, for example, down-conversion of an HDTV (High Definition Television) image of 1920 pixels×1080 lines to an image of, for example, 320 pixels×240 lines is required for display on the display of a mobile phone. In short, the spatial resolution must be converted according to the spec of image equipment. Further, there may be the case where time resolution in which difference is caused due to difference in refresh rate may be converted in addition to the spatial resolution. For example, a telecine process for converting a movie film format of 24 frames per second into a video format of 30 frames per second is raised as one example.

In resolution conversion, generation of data of which resolution is greater than that at sampling is called "super-resolution." For example, displaying an image recorded in DV format (576 pixels×480 lines) as an HDTV image requires super-resolution processing for increasing the pixels about two times and the lines about 2.5 times. Also, a high-resolution script is needed for printing. For example, printing on A4 paper (297 mm×210 mm) at a resolution of 600 dpi requires preparation of a script of 7128 pixels×5040 lines. Almost of all cameras have a resolution lower than it, and accordingly, the super-resolution processing is essential in, for example, direct printing from a digital still camera to a printer. The aforementioned two examples use pixel count and line count for representing the resolution and is defined as "space-domain super-resolution." On the other hand, there may be a case requiring "time-domain super-resolution" for increasing time resolution to be higher than that at sampling. For example, displaying an image recorded by a branch scanning (interlace) method on a display by sequential scanning (progressive) method requires time-domain super-resolution processing for increasing the time resolution two times. Such processing is used in various cases such as a case for using analog broadcast material in digital broadcast.

Such super-resolution processing is regarded as interpolation for generating new data from existing data. The principal conception of the interpolation is estimation of new data from existing data present in the vicinity of the new data. In the space-domain super-resolution, signal values of new data are estimated from signal values of pixels horizontally, perpendicularly, or obliquely adjacent thereto. In the time-domain super-resolution, new data is estimated from immediately preceding data and next data. As specific methods for the space-domain super-resolution, a nearest neighbor interpolation, a bi-linear interpolation, bi-cubic interpolation, and the like are generally known (Non-patent Document 1: "Clarify Three-dimensional Computer Graphics," Sinji Araya, published by Kyoritsu Shuppan, Sep. 25, 2003, pp. 144–145). Further, there has been proposed compensation for quality degradation, which is due to blur in these interpolation methods, by supplementing high frequency component (Patent Document 1: Japanese Patent Application Laid Open Publication No. 2003-018398A (FIG. 2)).

On the other hand, there has been proposed a method for realizing super-resolution processing in a manner that much low-resolution data are collected so as to include an overlapping region and the corresponding points are connected (Patent Document 2: Japanese Patent Application Laid Open Publication No. 10-069537A (FIG. 2)).

SUMMARY OF THE INVENTION

The super-resolution processing techniques disclosed in Non-patent Document 1 and Patent Document 1 as mentioned above, however, ignore patterns, gloss and the like in the surfaces of objects, and no mechanism for maintaining patterns, gloss, and the like of the original images in images that have been subjected to the super-resolution processing is included. In this connection, texture impression of the original images shall be degraded by the super-resolution processing and the texture feelings about the objects in the images may become different.

Also, the technique in Patent Document 2 requires image shooting plural times, resulting in increase in number of working processes.

The present invention has been made in view of the above problems and has its objective of providing an image processing technique for generating an image of which information content is greater than that of the original image with no degradation in image feature of the original image.

In order to solve the above problems, in the present invention, an image feature (e.g., density distribution, frequency distribution, contrast, and the like) of the original image is analyzed, and information densification processing for increasing the image content is performed using the thus analyzed image feature and an image feature obtained from an information densified image of which information content (e.g., pixel count, gradation count, color channel count, and the like) is greater than that of the original image. Especially, when resolution is employed as the image information content, the texture (a general term of an attribute such as patterns, gloss and the like) of an input image is analyzed, and a space-domain super-resolution image or a time-domain super-resolution image is generated using the thus analyzed texture feature quantity and super-resolution texture feature quantity obtained from a super-resolution image having a higher spatial or time resolution.

According to the present invention, an information densified image of which image feature is maintained with no degradation of image feature of the original image and of which image information content is greater than that of the original image can be generated. Especially, when resolution is employed as the image information content, a space-domain super-resolution image or a time-domain super-resolution image can be generated while maintaining impression of the texture that the original image has.

DESCRIPTION OF THE PREFERRED EMBODIMENTS

Figure 1:
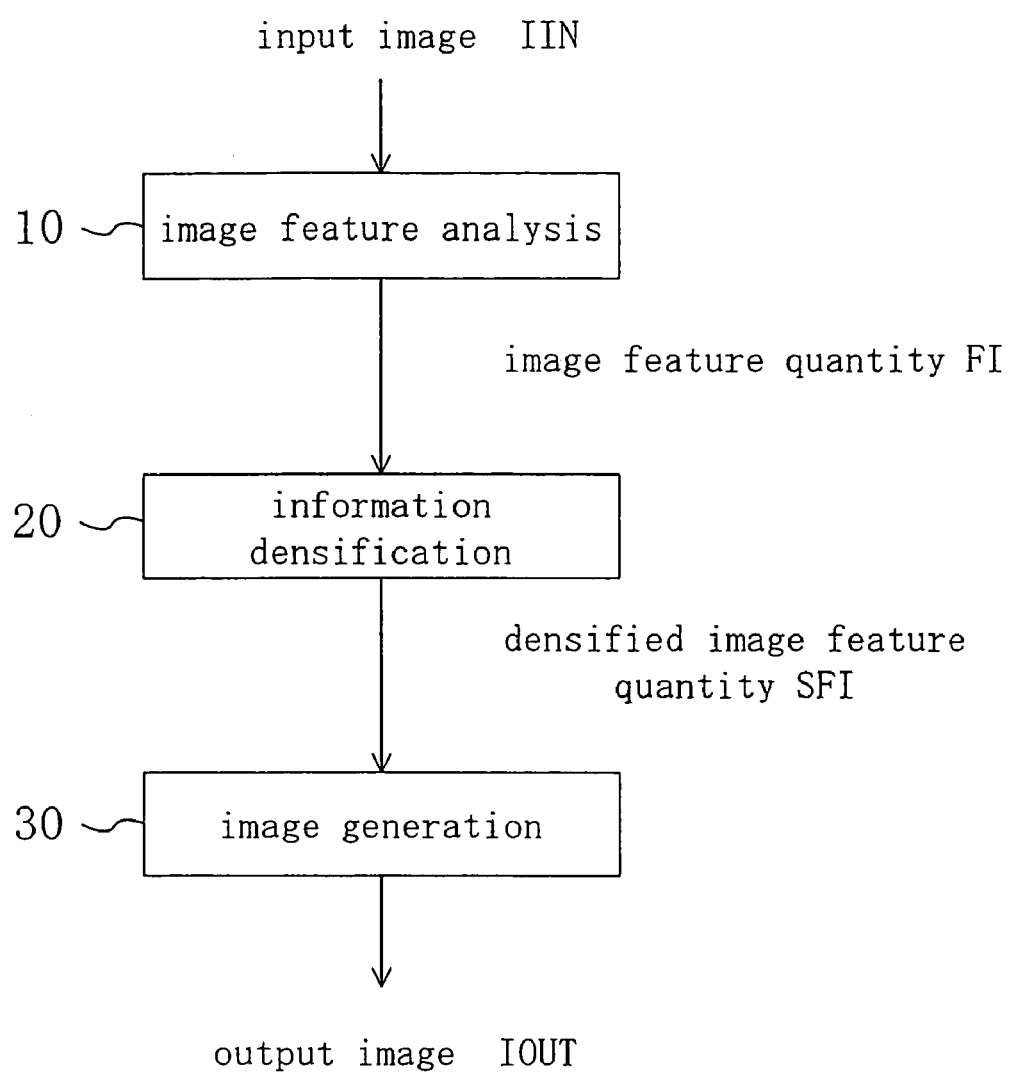
FIG. 1 is a block diagram illustrating the constitution of an image processing apparatus according to the first embodiment of the present invention.

The first aspect of the present invention provides an image processing method including: a first step of performing image feature analysis for an original image to obtain an image feature quantity independent from image coordinates; a second step of subjecting the image feature quantity obtained in the first step to information densification to obtain a densified image feature quantity; and a third step of generating, based on the densified image feature quantity obtained in the second step, a densified image in which an information content of the original image is densified.

The second aspect of the present invention provides the image processing method of the first aspect, wherein the second step includes the steps of: selecting an image feature category to which the image feature quantity belongs from a plurality of image feature categories prepared in advance; and reading out a basic image feature quantity, of which information content is densified, in the selected image feature category as the densified image feature quantity from a densified image feature database.

The third aspect of the present invention provides the image processing method of the first aspect, wherein the second step includes the steps of: calculating respective similarities of the image feature quantity to plural image feature categories prepared in advance; and summing respective basic image feature quantities in the plural image feature categories with weights according to the respective calculated similarities to generate the densified image feature quantity.

The fourth aspect of the present invention provides the image processing method of the first aspect, wherein the second step includes the steps of: selecting an image feature category to which the image feature quantity belongs from a plurality of image feature categories prepared in advance; and converting the image feature quantity to the densified image feature quantity by referencing a conversion table database and using a conversion table for feature quantity conversion in the selected image feature category.

The fifth aspect of the present invention provides the image processing method of the fourth aspect, wherein the plurality of image feature categories are provided for respective material properties of an object shot in an image.

The sixth aspect of the present invention provides the image processing method of the first aspect, wherein spatial resolution or time resolution is used as the image feature quantity.

The seventh aspect of the present invention provides the image processing method of the sixth aspect, wherein spatial frequency response or time frequency response is obtained using Fourier transform.

The eighth aspect of the present invention provides the image processing method of the sixth aspect, wherein spatial frequency response or time frequency response is obtained using wavelet transform.

The ninth aspect of the present invention provides the image processing method of the sixth aspect, wherein spatial frequency response or time frequency response is obtained using a plurality of spatial filters of which at least one of scale, phase, and spatial directionality is different from each other.

The tenth aspect of the present invention provides an image processing apparatus including: an image feature analysis section that performs image feature analysis for an original image to obtain an image feature quantity independent from image coordinates; an information densification section that performs information densification for the image feature quantity obtained by the image feature analysis section to obtain a densified image feature quantity; and an image generation section that generates, based on the densified image feature quantity obtained by the information densification section, a densified image in which an information content of the original image is densified.

The eleventh aspect of the present invention provides an image processing program that allows a computer to execute: a first step of performing image feature analysis for an original image to obtain an image feature quantity independent from image coordinates; a second step of subjecting the image feature quantity obtained in the first step to information densification to obtain a densified image feature quantity; and a third step of generating, based on the densified image feature quantity obtained in the second step, a densified image in which an information content of the original image is densified.

The preferred embodiments of the present invention will be described below with reference to the drawings.

(First Embodiment)

FIG. 1 is a block diagram illustrating the constitution of an image processing apparatus according to the first embodiment of the present invention. The image processing apparatus shown in FIG. 1 generates an information densified image of which information content is greater than that of the original image.

Herein, "information densification" in the present description means processing for increasing the image information content of a provided image and is called, under certain circumstances, "super information processing" or "super computerization." The term, image information content represents pixel count, gradation count, color channel count, and the like, for example. Referring to pixel count, for example, information densification for expanding an image of 320 pixels×240 lines four times in both the horizontal and perpendicular directions generates an image of 1280 pixels× 960 lines of which total pixel count is 16 times. In a case of gradation count, the processing for expanding an input image in which each pixel has 128 gradations to be an image in which each pixel has 256 gradations corresponds to two-time information densification. In a case of color channel count, conversion of a monochrome image (one color channel) to an RGB image corresponds to three-time information densification.

Conversion in combination of the above three examples, that is, conversion of "a monochrome image of 320 pixels× 240 lines, each pixel being composed of one color channel with 128 gradations" to "an RBG image of 1280 pixels×960 lines, each pixel being composed of three color channels with 256 gradations" corresponds to information densification for increasing the image information content 96 times (16×2×3).

Referring to the constitution in FIG. 1, an image feature analysis section 10 analyzes an image feature of an input image IIN as the original image and outputs an image feature quantity FI (first step). Herein, the image feature means, for example, density distribution, frequency response, contrast, and the like, and they are expressed by a density histogram, a frequency spectrum, a ratio of a highlighted part to a dark part, respectively. An information densification section 20 performs information densification based on the image feature quantity FI and outputs a densified image feature quantity SFI (second step). Direct information densification of the image feature quantity FI realizes image content densification of an image with no degradation of the image feature itself. An image generation section 30 visualizes the densified image feature quantity SFI to generate an output image IOUT as a densified image (third step).

Figure 2:
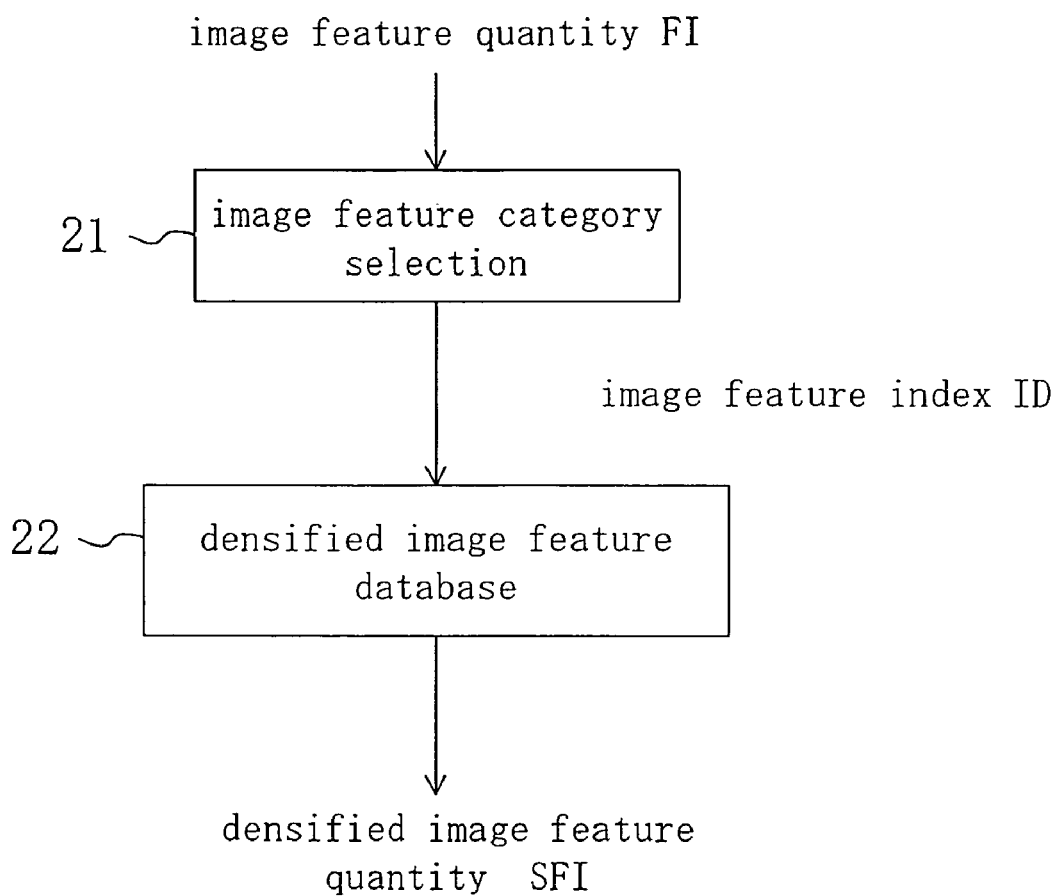
FIG. 2 shows one example of the constitution of the information densification section in FIG. 1.

FIG. 2 shows one example of the constitution of the information densification section 20 in FIG. 1. In FIG. 2, an image feature category selection section 21 selects, from image feature categories classified in advance, a category to which the image feature quantity FI belongs and outputs an image feature index ID indicating the kind of the selected feature quantity category. The image feature index ID is provided to a densified image feature database 22, so that an information densified image feature quantity which corresponds to the image feature index ID is output as a densified image feature quantity SFI from the densified image feature database 22.

Specifically, for example, the image feature quantity is expressed in terms of vector (for example, the frequency of a density histogram is used as a vector element.), and similar vectors are gathered by an optional clustering algorithm (e.g., K-means clustering algorithm) to form categories. Then, a category is selected by vector quantization. This is an effective algorithm. The densified image feature database 22 is structured prior to execution of the information densification. A densified sample image of which information content is greater than that of an input image is prepared in advance for obtaining the image feature quantity of, for example, density histogram. For example, for converting an input image of 320 pixels×240 lines to a densified image of 1280 pixels×960 lines, an image of 1280 pixels×960 lines is prepared as a densified sample image. The vector expression method, the clustering algorithm, and the method of providing an image feature index employed in the image feature category selection section 21 and the densified image feature database 22 are common.

Figure 3:
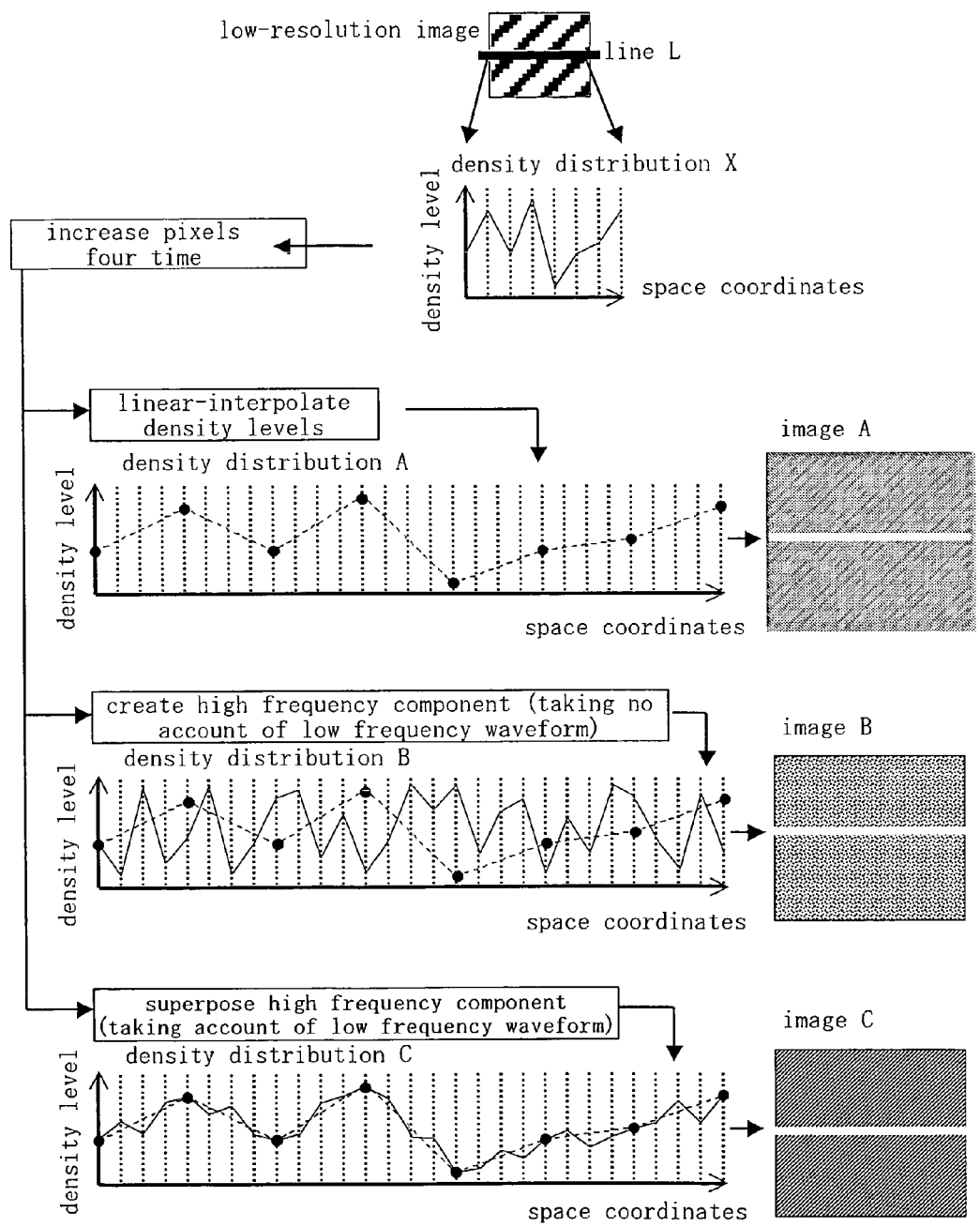
FIG. 3 is a conceptual drawing of space-domain super-resolution processing according to the first embodiment of the present invention.

FIG. 3 shows a conception of space-domain super-resolution processing using spatial resolution as an image information feature. Observation of the density distribution on a line L in a low-resolution image X results in a density distribution X. For convenience in explanation, the pixel count on the line L is set to 8 herein. Also, the density distribution reflects the data of the illustrated image not so precisely and is indicated for depicting the conception schematically. The same is applied to the following description.

In a case of super-resolution processing for increasing the pixel count four times, the pixel count of each line is to be 32, which necessitates 32 density levels. Accordingly, compensation of density data of 24 pixels by any means is necessary. In this case, a compensation method could be contemplated in which the density of the low-resolution image X is arranged at regular intervals of four pixels and the pixels therebetween are compensated by linear interpolation, as shown in the density distribution A, for example. In this case, however, a blurry image like the image A is obtained due to smooth gradient while the increase/decrease pattern of density variation along the line L is maintained. This is the case where four-time increase in image information content degrades the image feature, that is, a texture impression.

On the other hand, the density distribution B indicates high frequency component created regardless of the waveform of the density distribution X serving as low frequency component. The variation in density level becomes greater and more sharp than that of the density distribution A, so that fine texture like the image B is generated. However, the waveform is rather different from that of the density distribution A, with a result of degradation of the texture impression.

The density distribution C is obtained in a manner that the density distribution A is maintained as the low frequency component and high frequency component of which spatial frequency is higher than that of the density distribution A is superposed. In this case, the low frequency component traces the basic pattern of the texture and a texture pattern of which high frequency component is fine is added, so that short of density level for 24 pixels can be compensated while maintaining the texture impression.

It is noted that the above description is applicable to interpolation in the horizontal direction of images as well, and the description thereof is omitted.

Next, a method for realizing practically "the technical conception for superposing the high frequency component on the low frequency component" (density distribution C) as depicted in FIG. 3 will be described with reference to FIG. 4, FIG. 5, FIG. 6, and FIG. 7.

Figure 4:
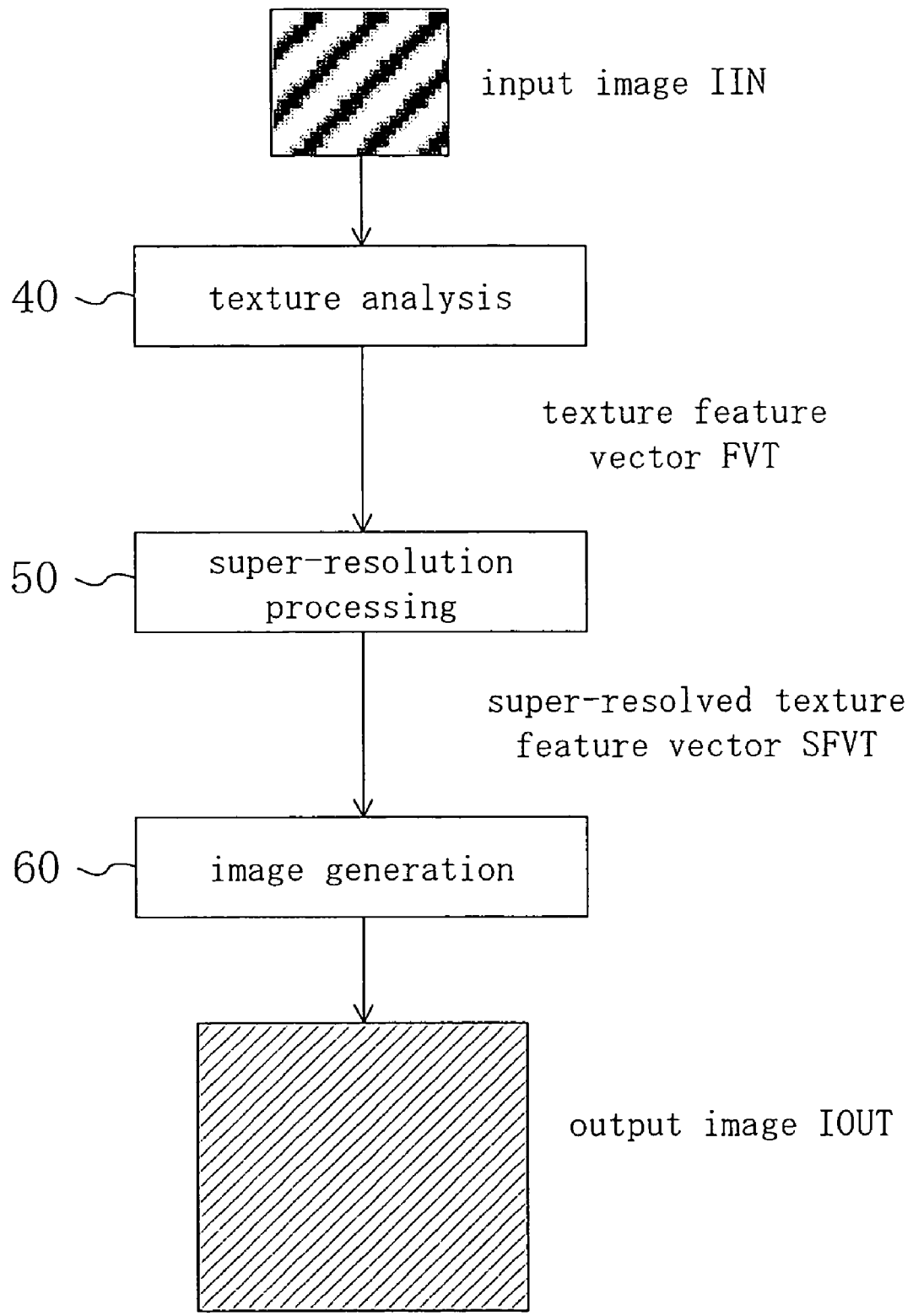
FIG. 4 is a block diagram illustrating the schematic constitution of an image processing apparatus for performing the space-domain super-resolution processing according to the first embodiment of the present invention.

FIG. 4 is a block diagram illustrating the schematic constitution of an image processing apparatus for performing space-domain super-resolution processing using spatial resolution as the image information feature. The texture as the image feature of the input image IIN is analyzed on a pixel-by-pixel basis in a texture analysis section 40 as the image feature analysis section, so as to be described as a texture feature vector FVT. A super-resolution processing section 50 as the information densification section executes the super-resolution processing in the texture feature space to convert the texture feature vector FVT as the image feature quantity to a super-resolved texture feature vector SFVT as a densified image feature quantity. An image generation section 60 visualizes the super-resolved texture feature vector SFVT and outputs the output image IOUT.

Figure 5:
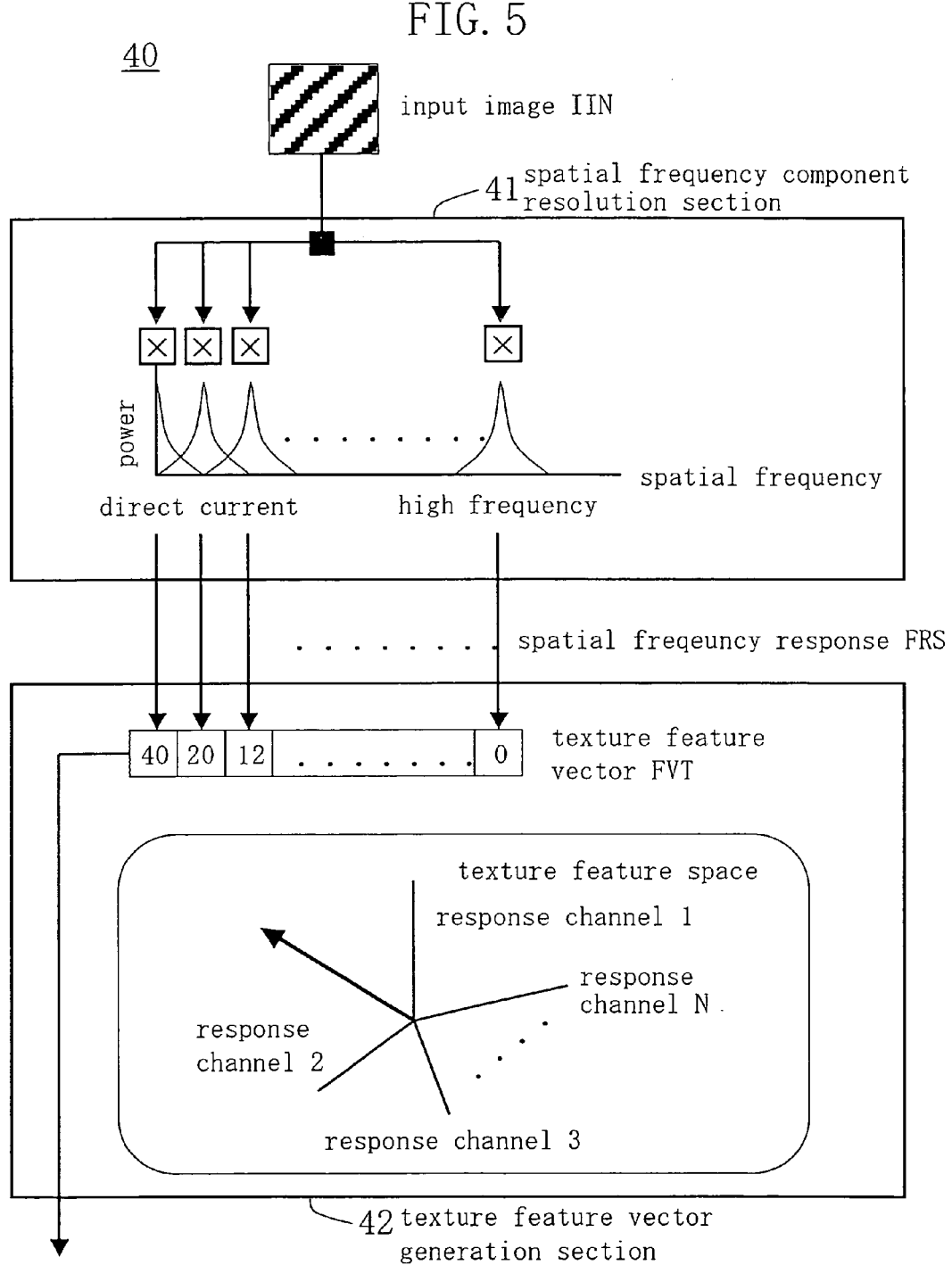
FIG. 5 is a drawing showing one example of the constitution and the processing of the texture analysis section in FIG. 4.

FIG. 5 shows one example of the constitution and the processing of the texture analysis section 40 in FIG. 4. As shown in FIG. 5, the texture analysis section 40 performs the texture analysis using spatial frequency response. The input image IIN is divided into a plurality of channels in a special frequency component resolution section 41 to be provided to respective spatial frequency bands, thereby obtaining special freqeuncy responses FRS. A texture feature vector generation section 42 generates a texture feature vector FVT using the spatial freqeuncy responses FRS as elements. The texture feature vector FVT has a direction and a scale within a texture feature space with response channels in the spatial frequency bands as axes, and describes the texture according to the attribute thereof. It is noted that if each element of the feature quantity is independent from each other, the feature quantity is described highly efficiently with no overlapping region. Therefore, Fourier transform and wavelet transform are effective for resolving the spatial frequency components. The spatial frequency response may be obtained using a plurality of spatial filters of which at least one of scale, phase and spatial directionality is different from each other.

Figure 6:
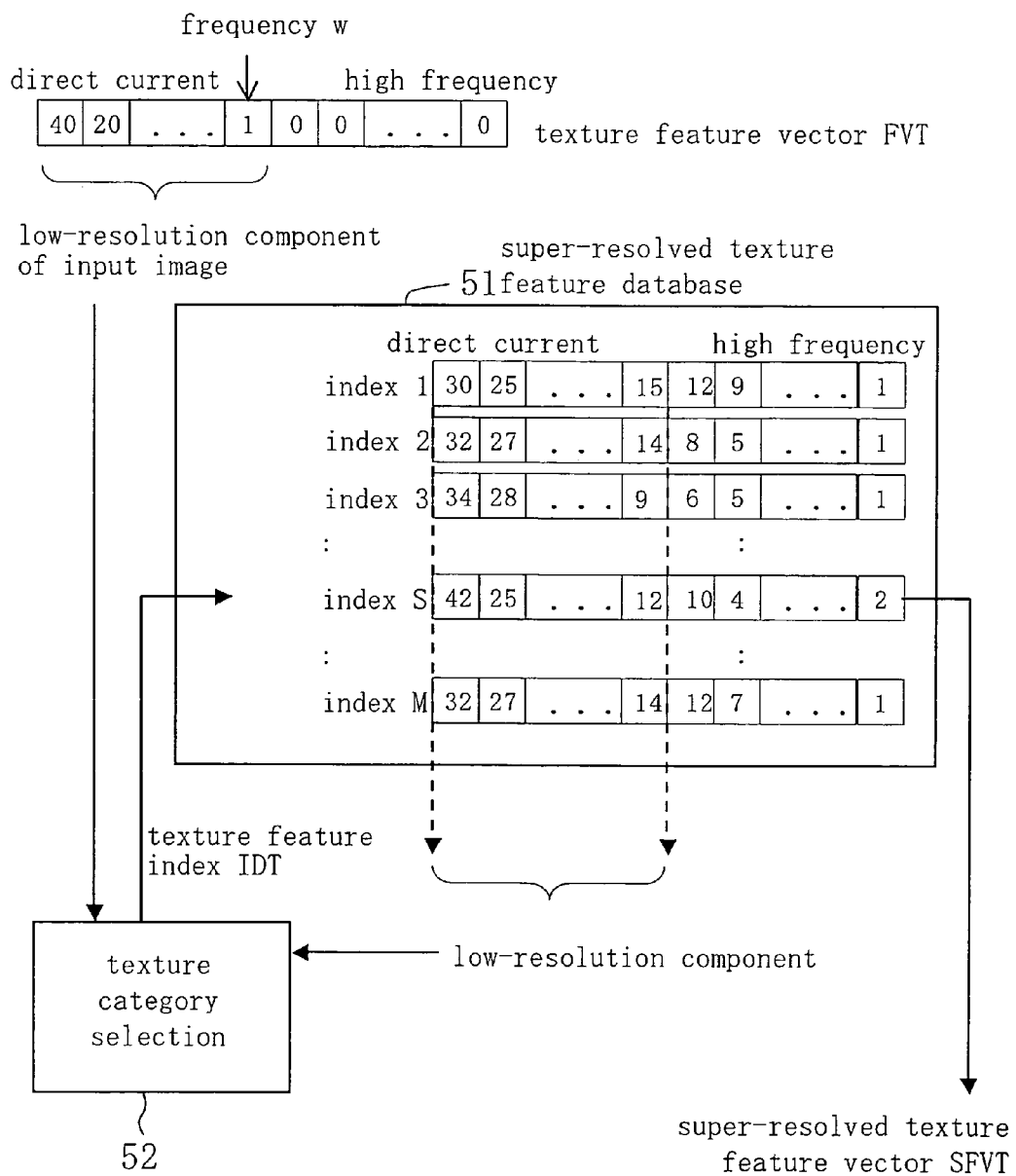
FIG. 6 is a drawing showing one example of the constitution and the processing of the super-resolution processing section in FIG. 4.

FIG. 6 shows one example of the constitution and the processing of the super-resolution processing section 50 in FIG. 4. In FIG. 6, a super-resolved texture feature database 51 stores, on a category-by category basis of the plural image feature categories, texture feature vectors generated from a sample image of which resolution is grater than that of an input image IIN. To texture feature vectors, respective indexes 1 to M are provided for specifying the image feature category. A texture category selection section 52 compares the texture feature vector FVT describing the texture of the input image IIN with each texture feature vector stored in the super-resolved texture feature database 51.

Herein, the texture feature vector FVT of the input image IIN, which has a resolution lower than that of the sample image, has no effective response in the high frequency component (response over a threshold value provided arbitrarily), and a response appears in the range from direct-current component to intermediate frequency component (frequency w in this case). In this connection, the texture category selection section 52 calculates each inner product of the vectors, specifically, inner products of low-resolution components corresponding to those having response in the texture feature vectors FVT, and sets the results as similarities. The index (an index S in this case) having the largest inner product (the highest similarity) is selected as the texture feature index IDT, so that the texture feature vector to which this texture feature index IDT is provided is output as a super-resolved texture feature vector SFVT. The super-resolved texture feature vector SFVT has response also in a frequency band over the frequency w, and this corresponds to the super-resolution processing in the texture feature space. Wherein, the response amounts are indicated in a dynamic range of 0 to 100 in FIG. 6.

Figure 7:
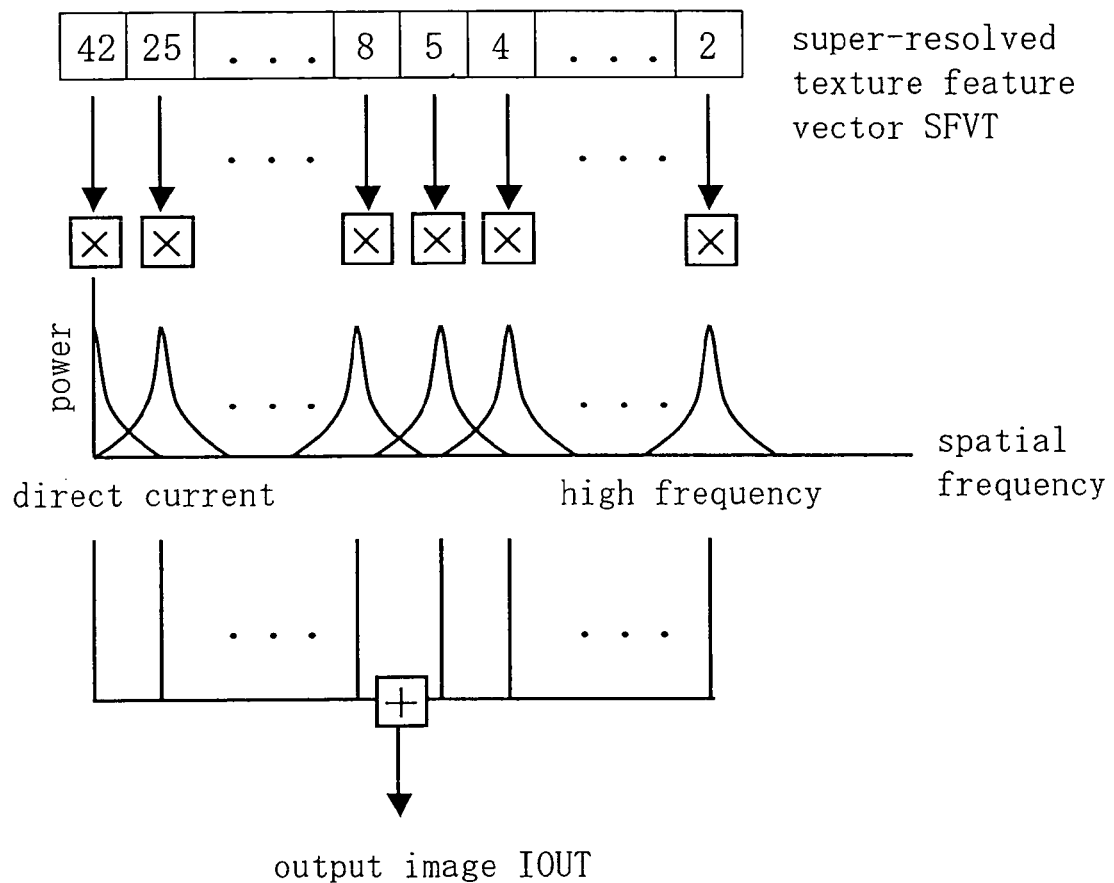
FIG. 7 is a drawing showing one example of the constitution and the processing of the image generation section in FIG. 4.

FIG. 7 shows one example of the constitution and the processing of an image generation section 60. As shown in FIG. 7, the processing herein is reversed processing of the spatial frequency resolution depicted in FIG. 5. In detail, a basic function and a product in each band of the spatial frequency are calculated for each elemet of the super-resolved texture feature vector SFVT, and the sum of all the channels is output as the output image IOUT. Wherein, in the case where Fourier transform or wavelet transform is employed in the texture analysis section 40, the image generation section 60 executes inverse transform to the employed one.

As described above, in the present embodiment, the texture selection is performed in a manner that the texture of an input image is described in terms of spatial frequency spectrum and is compared with a spatial frequency spectrum generated from a super-resolution sample image of which resolution is greater than that of the input image. Hence, an effect that the texture impression of the image subjected to super-resolution processing matches that of the input image can be obtained with reliability.

It is noted that though the space-domain super-resolution processing using the spatial resolution as the image feature quantity is described herein, time-domain super-resolution processing using time resolution as the image future amount can be performed as well as the space-domain super-resolution processing described herein. In this case, the texture is generated from difference in level of video signals accompanied by time variation. Accordingly, the texture analysis section 40 in FIG. 4 is composed of time-domain to perform time frequency resolution. The procedures following the time-domain development are the same as those depicted in FIG. 4 to FIG. 7, and therefore, the description thereof is omitted.

(Second Embodiment)

Figure 8:
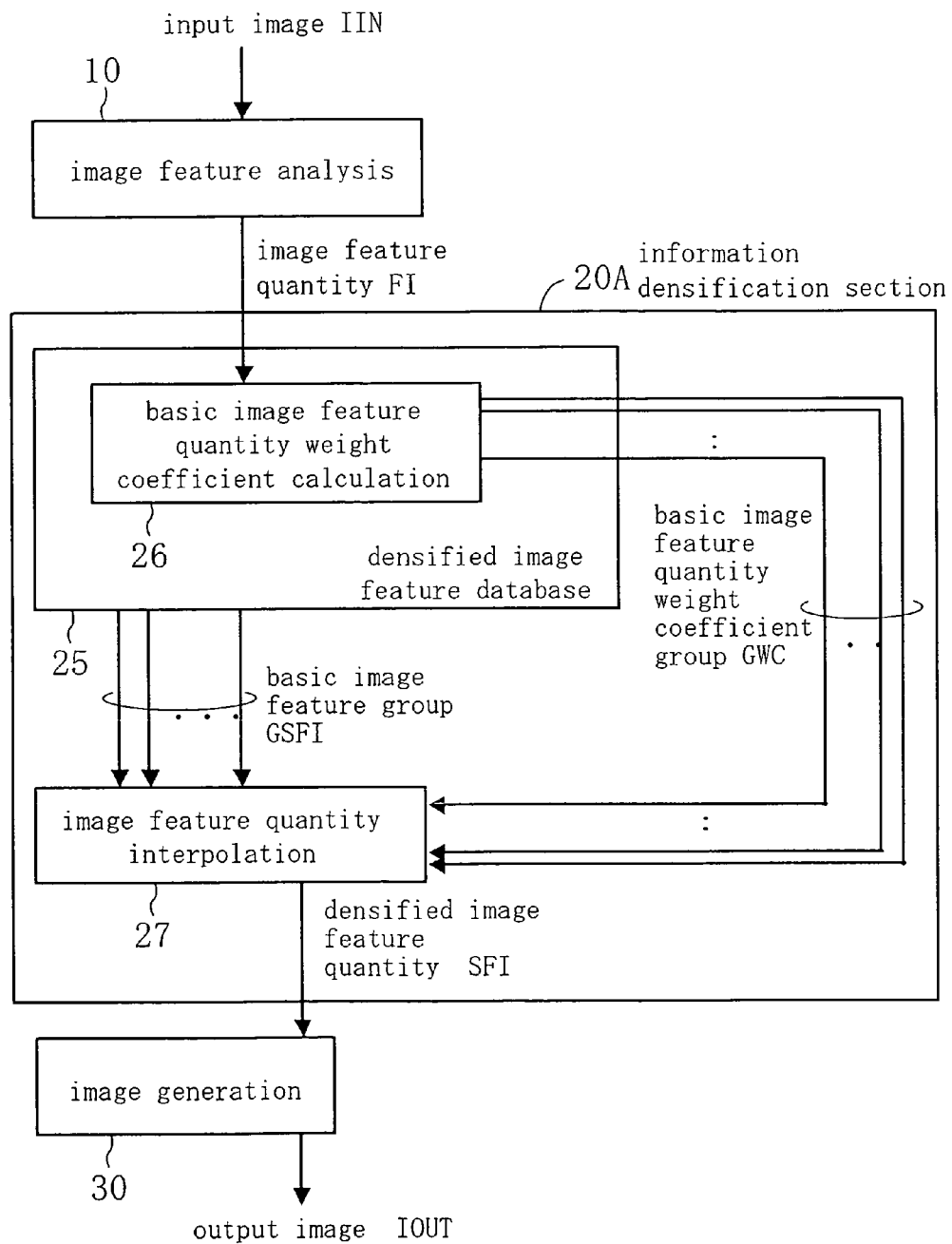
FIG. 8 is a block diagram illustrating the constitution of an image processing apparatus according to the second embodiment of the present invention.

FIG. 8 is a block diagram illustrating the constitution of an image processing apparatus according to the second embodiment of the present invention. The image processing apparatus shown in FIG. 8 generates an information densified image of which information content is greater than that of the input image, similar to the image processing apparatus in FIG. 1. In FIG. 8, the same reference numerals are assigned to the elements common to those in FIG. 1, and the detailed description thereof is omitted.

An information densification section 20A includes a densified image feature database 25, a basic image feature quantity weight coefficient calculation section 26, and an image feature quantity interpolation section 27. The densified image feature database 25 stores, on a category-by-category basis of the plural image feature categories, basic image feature quantities which are densified in information content and are generated from a densified sample image of which information content is greater than that of the input image IIN. The basic image feature quantity weight coefficient calculation section 26 calculates each similarity between the image feature quantity FI obtained from the input image IIN and the basic image feature quantities stored in the densified image feature database 25 to obtain a basic image feature quantity weight coefficient group GWC based on the calculated similarities. The basic image feature quantity weight coefficient group GWC is provided to the image feature quantity interpolation section 27. In association therewith, the densified image feature database 25 supplies a stored basic image feature group GSFI to the image feature quantity interpolation section 27. The image feature quantity interpolation section 27 calculates weighing linear sum of the basic image feature group GSFI, using the basic image feature quantity weigh coefficient group GWC and outputs the results as densified image feature quantities SFI.

In short, the information densification is performed by linear interpolation in the image feature space in the present embodiment. Accordingly, the image feature of the input image IIN is maintained in the densified output image IOUT. Further, the interpolation of the plural basic image feature quantities using the basic image feature quantity weight coefficients enables generation of further precise image feature quantities of which information content is densified.

Figure 9:
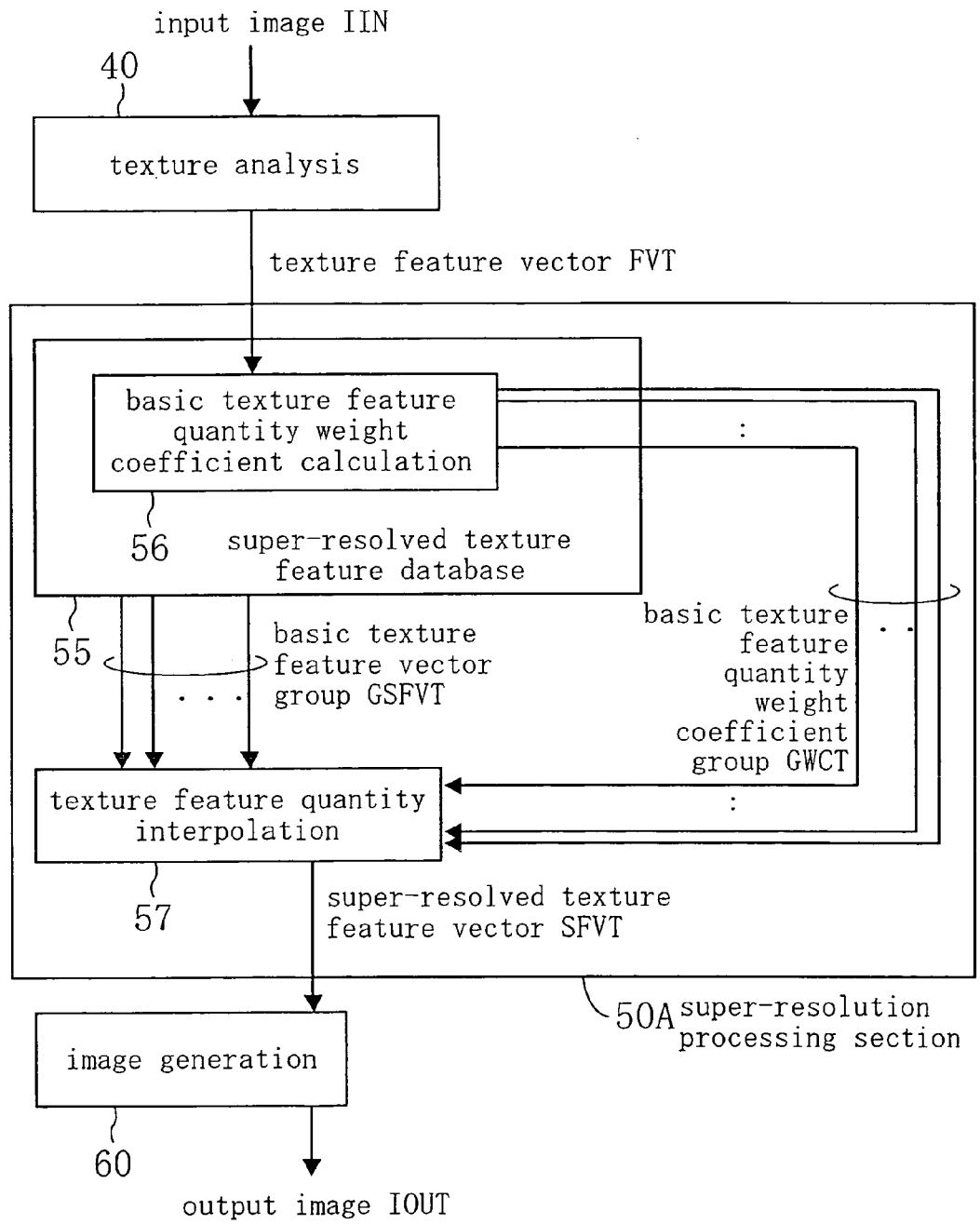
FIG. 9 is a block diagram illustrating the schematic constitution of an image processing apparatus for performing the space-domain super-resolution processing according to the second embodiment of the present invention.

FIG. 9 is a block diagram illustrating the schematic constitution of an image processing apparatus for performing space-domain super-resolution processing using spatial resolution as the image information content. In FIG. 9, the same reference numerals are assigned to the elements common to those in FIG. 4, and the detailed description thereof is omitted.

A super-resolution processing section 50A as the information densification section includes a super-resolved texture feature database 55, a basic texture feature quantity weight coefficient calculation section 56, and a texture feature quantity interpolation section 57. The super-resolved texture feature database 55 stores, on a category-by-category basis of the plural image feature categories, super-resolved basic texture feature vectors, as basic image feature quantities, which are generated from super-resolved sample images of which resolution is greater than that of the input image IIN. The basic texture feature quantity weight coefficient calculation section 56 calculates each similarity between the texture feature vector FVT obtained from the input image IIN and the basic texture feature vectors stored in the super-resolved texture feature database 55 to obtain a basic texture feature quantity weight coefficient group GWCT based on the calculated similarities. The basic texture feature quantity weight coefficient group GWCT is provided to the texture feature quantity interpolation section 57. In association therewith, the super-resolved texture feature database 55 supplies a stored basic texture feature vector group GSFVT to the texture feature quantity interpolation section 57. The texture feature quantity interpolation section 57 calculates weighing linear sum of the basic texture feature vector group GSFVT, using the basic texture feature quantity weight coefficient group GWCT and outputs the results as the super-resolved texture feature vectors SFVT.

In short, the super-resolution processing is performed by linear interpolation in the texture feature space. Accordingly, the texture of the input image IIN is maintained in the super-resolved output image IOUT. Further, the interpolation of the plural basic texture feature quantities using the basic texture feature quantity weight coefficients enables generation of further precise image feature quantities of which information content is densified.

Figure 10:
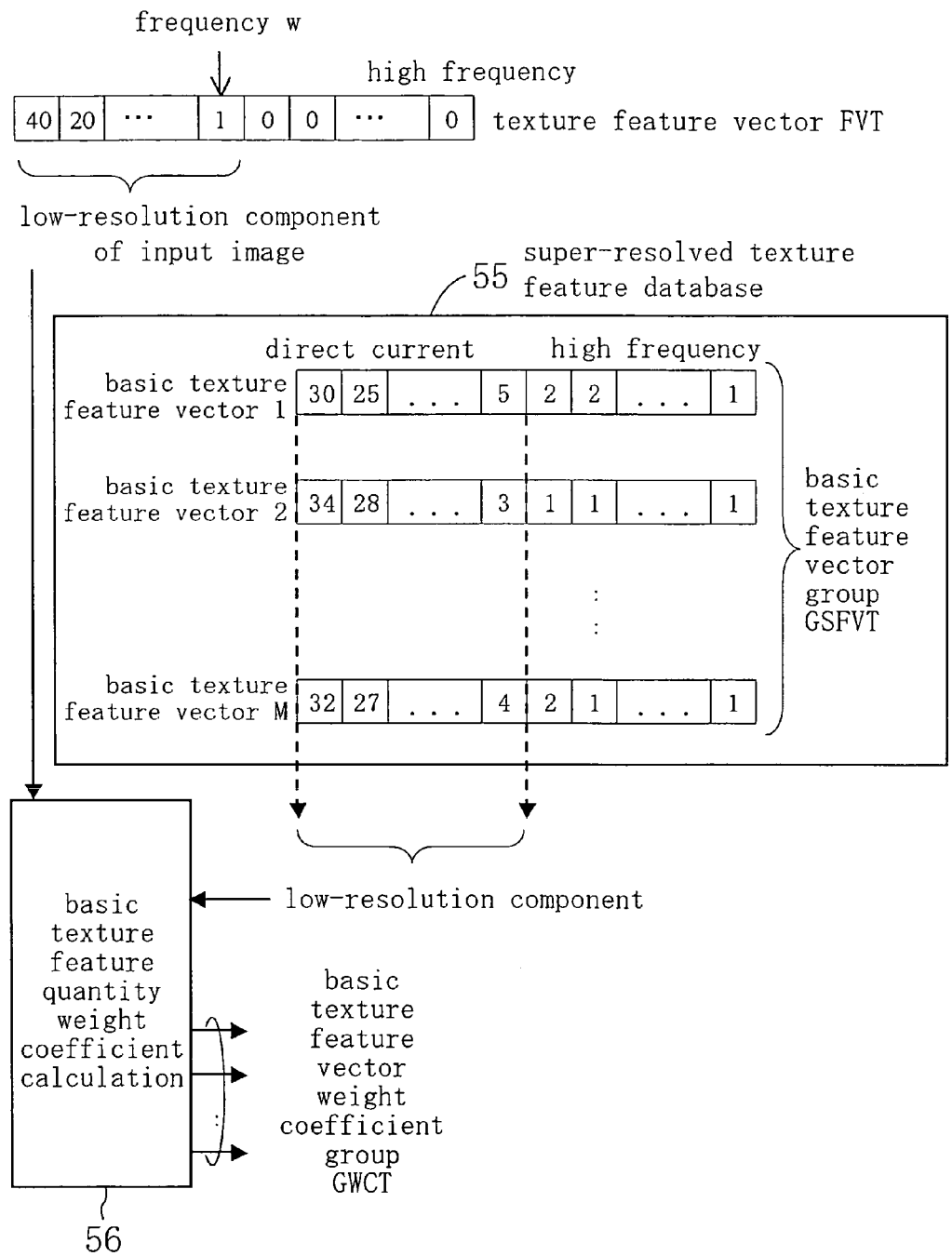
FIG. 10 is a drawing showing one example of a method of calculating a basic texture feature quantity weight coefficient in the constitution of FIG. 9.

FIG. 10 shows one example of a method of calculating a basic texture feature quantity weight coefficient. The basic texture feature quantity weight coefficient calculation section 56 calculates similarities of the texture feature vector FVT describing the texture of the input image IIN to the basic texture feature vector group GSFVT that the super-resolved texture feature database 55 stores. The texture feature vector FVT has no effective response in the high frequency component (response over a threshold value provided arbitrarily), and a response appears in the range from direct-current component to intermediate frequency component (frequency w in this case). In this connection, the basic texture feature quantity weight coefficient calculation section 56 calculates each inner products of the vectors, specifically, inner products of low-resolution components corresponding to those having response in the texture feature vector FVT, and sets the results as similarities. Subsequently, normalization is performed so that the total sum of the inner products becomes 1, and then, the results are output as a basic texture feature vector weight coefficient group GWCT. The basic texture feature vector group GSFVT has response also in a frequency band over the frequency w, and this corresponds to the super-resolution processing in the texture feature space. Wherein, the response amounts are indicated in a dynamic range of 0 to 100 in FIG. 10.

As described above, in the present embodiment, the super-resolved texture feature vector is calculated in a manner that the texture of an input image is described in terms of spatial frequency spectrum and the basic texture feature vectors generated from a super-resolution sample image of which resolution is greater than that of the input image are linear-interpolated using the weight coefficients obtained from the similarities. Hence, an effect that the texture impression of the image subjected to super-resolution processing matches that of the input image can be obtained with reliability.

It is noted that though the space-domain super-resolution processing using the spatial resolution as the image feature quantity is described herein, time-domain super-resolution processing using time resolution as the image future amount can be performed as well as the space-domain super-resolution processing described herein. In this case, the texture is generated from difference in level of video signals accompanied by time variation. Accordingly, the texture analysis section 40 in FIG. 9 is composed of time-domain to perform time frequency resolution. The procedures following the time-domain development are the same as those described in FIG. 9, and therefore, the description thereof is omitted.

(Third Embodiment)

Figure 11:
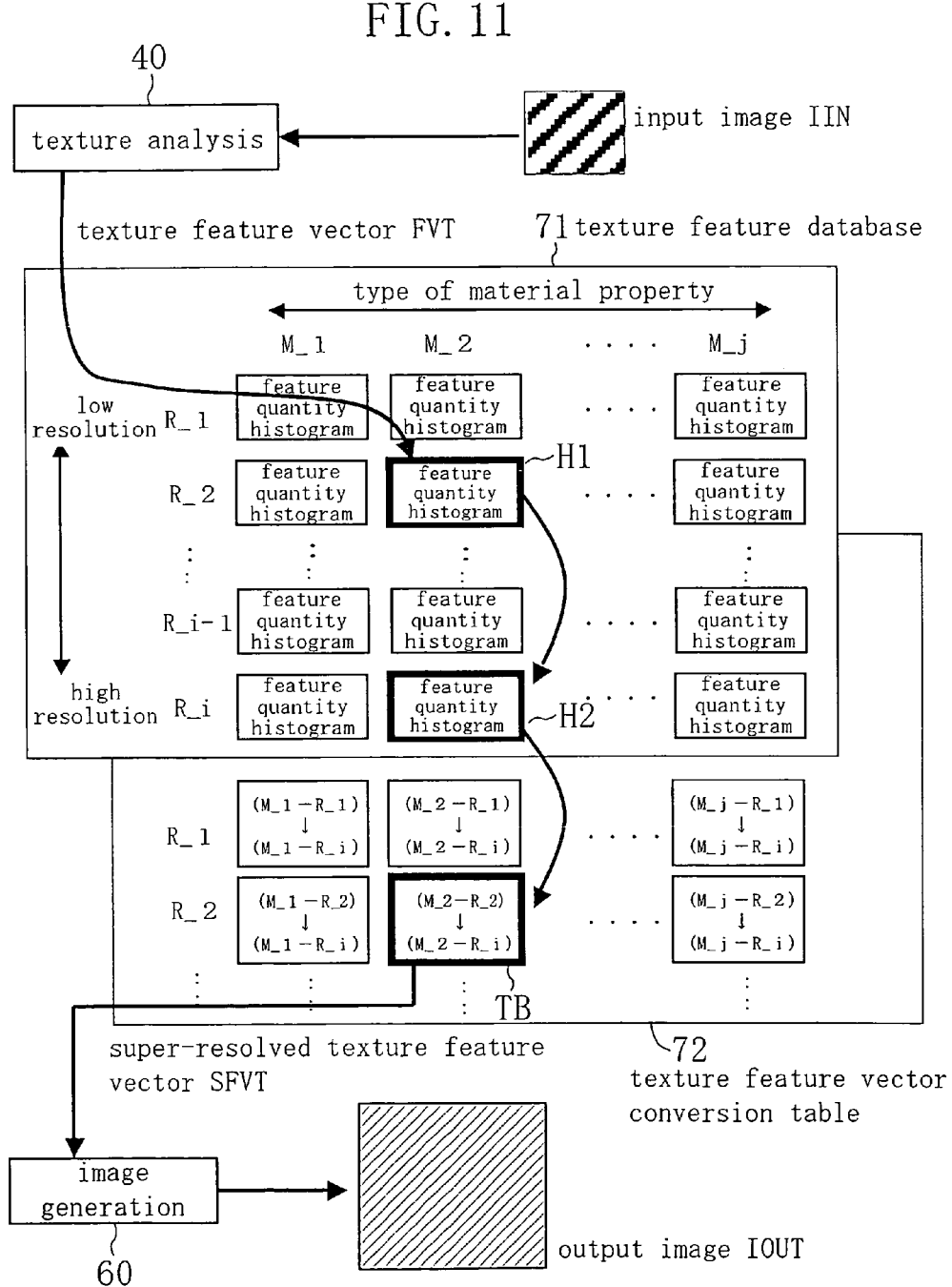
FIG. 11 is a drawing illustrating the constitution of an image processing apparatus according to the third embodiment of the present invention.

FIG. 11 shows the constitution of an image processing apparatus according to the third embodiment of the present invention. The image processing apparatus shown in FIG. 11 generates a super-resolution image IOUT of which resolution is greater than that of the input image IIN, and the same reference numerals are assigned to the elements common to those in FIG. 4. The information densification section is composed of a texture feature database 71 and a texture feature vector conversion table 72. The texture as the image feature of the input image IIN is analyzed on a pixel-by-pixel basis in the texture analysis section 40 to be described as a texture feature vector FVT. The internal operation of the texture analysis section 40 is the same as that in FIG. 5 for generating the texture feature vectors FVT from spatial freqeuncy responses FRS.

The texture feature database 71 is built from images of i levels of resolutions and j types of material properties, namely, (i×j) sample images in total. The (i×j) sample images are converted to texture feature vectors by the texture analysis section 40, and the histograms thereof are registered on a per sample image basis into the texture feature database 71. In detail, the texture feature vectors are obtained on a pixel-by-pixel basis of the sample images by the texture analysis section 40 and the frequency of the texture feature vectors of all the pixels is obtained. Whereby, a plurality of image feature categories M_1 to M_j are defined on a type-by-type basis of the material properties shot in the image.

One of the conditions for the super-resolution herein is that at least one of i levels of different resolutions of the sample images is greater than that of the input image IIN. Also, the material properties mean woodgrain, paper, stone, sand, and the like, for example, and may be defined according to physical properties or the visual sense of a human. Further, referring to the woodgrain, various expressions are possible, such as a woodgrain of which surface is rough or smooth, a bright woodgrain, and the like. Thus, the expressions regarding the types of material properties are wide ranged. The present invention does not limit the expressions and recognizes any arbitrary definitions.

It is noted that in a case where frequencies of the elements of the feature quantity histograms are low with less pixels having the same texture feature vector, histogram formation by gathering similar vectors using a clustering algorithm (e.g., K-means clustering algorithm) reduces data amount with no degradation of the texture feature.

A feature quantity histogram obtained from the texture feature vectors FVT of all the pixels of the input image IIN is compared with the texture feature database 71 thus prepared in advance (wherein, histogram similarity comparison method is optional.). In FIG. 11, the feature quantity histogram H1 of the material property M_2 and the resolution R_2 is selected as the histogram having the highest similarity to the feature quantity histogram of the input image IIN. For super-resolution with no impression degradation of the texture as the image feature, a feature quantity histogram having a resolution greater than that of the input image IIN is selected in the image feature category of the same material property (the material property M_2 in this case). In this example, the feature quantity histogram H2 of the resolution R_i is selected.

It is noted that the processing is performed using the histograms herein, so as to be applicable to the case where the space information (space coordinates) does not match between at the execution time and at the learning time, that is, the time when the texture feature database 71 is structured.

Next, the texture feature vector conversion table 72 is utilized for super-resolution of the texture feature quantity of the input image IIN. The texture feature vector conversion table 72 is paired with the texture feature database 71 so as to store (i×j) conversion tables of i levels of resolutions and j types of material properties. The feature quantity histogram H1 of "the material property M_2 and the resolution R_2" is selected supposing that the feature quantity histogram H1 has the highest similarity to the texture feature vectors FVT of the input image IIN. Accordingly, the conversion table TB of "(M_2-R_2) to (M_2-R_i)" is referenced for converting the feature quantity histogram H to the feature quantity histogram H2 of "the material property M_2 and the resolution R_i". The output of the texture feature vector conversion table 72, which serves as a super-resolved texture feature vector SFVT, is visualized by the image generation section 60, thereby obtaining the output image IOUT.

Figure 12:
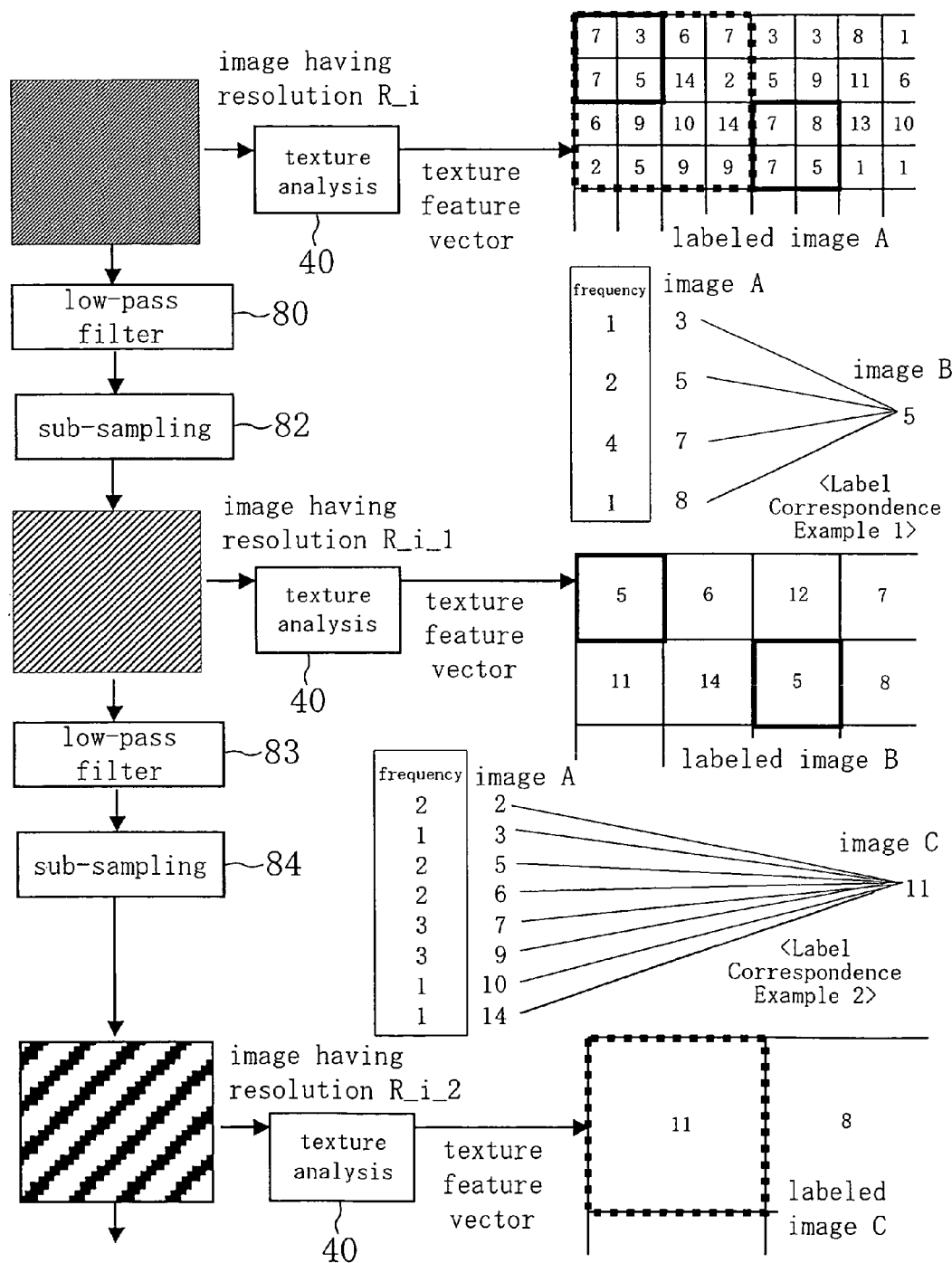
FIG. 12 is a drawing showing one example of a method of structuring a texture feature vector conversion table.

FIG. 12 shows one example of a method of structuring the texture feature vector conversion table 72. Low-resolution images are generated by a "low-pass filtering and sub-sampling" step by step, starting from the image having the highest resolution. Herein, the image having the highest resolution R–i is allowed to pass through a low-pass filter 81 and is reduced in resolution by the sub-sampling 82, thereby obtaining an image having a resolution R_i–1. Likewise, the image having the resolution R_i–1 is allowed to pass through a low-pass filter 83 and is reduced in resolution by the sub-sampling 84, thereby obtaining an image having a resolution R_i–2.

Then, the texture analysis is performed for the respective images to obtain respective texture feature vectors. In FIG. 12, the kinds of the texture feature vectors are expressed in terms of label number. Thus, a labeled image A of which each pixel has a label number is obtained from the image having the resolution R_i. Likewise, a labeled image B is obtained from the image having the resolution R_i–1, and a labeled image C is obtained from the image having the resolution R_i–2. Wherein, respective parts of the labeled images A, B, and C are illustrated schematically because it is unnecessary to show all the pixels in the description herein.

The texture feature vector conversion table for converting the image having the resolution R_i–1 to the image having the resolution R_i is structured according to the correspondence in label number between the labeled image B and the labeled image A as follows, for example. Suppose that, as indicated in "Label Correspondence Example 1", the label number "5" is present in two pixels of the labeled image B and corresponds to the four kinds of the texture feature vectors respectively having the label numbers "3", "5", "7", and "8" in the labeled image A. The frequencies are 1, 2, 4, and 1, respectively. Under the circumstances, the texture feature vector having the label number "7" of which frequency is the maximum is use as a super-resolved texture feature vector. The texture feature vector conversion table can be structured by such simple selection processing, for example.

Moreover, weighting linear sum of each texture feature vector according to the frequencies realizes super-resolution according to occurrence frequency, resulting in enhancement of texture maintenance while increasing the calculation amount.

In the aforementioned two methods, labels are in one-to-one correspondence and one texture feature vector is converted to one super-resolved texture feature vector. In the example in FIG. 12, one pixel of the labeled image B corresponds to four pixels of the labeled image A. Therefore, this causes assignment of the same texture feature vector to the four pixels of the labeled image A. Nevertheless, it is desired for effective super-resolution that different super-resolved texture feature vectors are assigned to the four pixels, respectively.

As a specific method for tackling this problem, it is possible to apply a super-resolved texture feature vectors to the respective pixels according to the respective label frequencies. In detail, among the eight pixels of the labeled image A corresponding to the label "5" of the labeled image B, the labels "3", "5", "7", and "8" are assigned to one pixel, two pixels, four pixels, and one pixels, respectively.

Wherein, the texture pattern rarely occupies the same spatial position at preparation of the texture feature database 71 as that at execution of the super-resolution for the input image IIN, and therefore, utilization of the spatial position information of the labeled image A is not necessarily appropriate. In this connection, it is preferable to assign super-resolved texture feature vectors to the pixels according to the label frequencies randomly by means of random number generation, or the like. While pixels are selected at random, each selected super-resolved texture feature vector and its frequency are determined according to the label correspondence.

On the other hand, the texture feature vector conversion table for converting the image having the resolution R_i−2 to the image having the resolution R_i is built from of a label number combination of the labeled image C and the labeled image A. For example, the combination and the frequency of the label number "11" of the labeled image C and the label of the labeled image A are as indicated in "Label Correspondence Example 2." There are two label numbers "7" and "9" of which frequency is the maximum, and accordingly, the average of the two texture feature vectors respectively having the labels "7" and "9" is set as a super-resolved texture feature vector. Or, the method is employable which is already mentioned as a method of preparing the conversion table for converting the image having the resolution R_i−1 to the image having the resolution R_i.

As described above, in the present embodiment, the texture feature quantities are super-resolved on a per material property basis, thereby realizing the super-resolution processing with no degradation of the material property feelings of the texture. Further, the texture feature quantity is prepared for each of the plural resolutions, thereby realizing the super-resolution processing with no texture degradation in both texture selection of the low-resolution phase (i.e., an input image) and image generation of the high-resolution phase (i.e., an output image).

It is noted that all or a part of the means in the image processing apparatus according to the present invention or of steps of the image processing method according to the present invention may be realized with the use of exclusive hardware or may be realized on software with a computer program.

(First Constitution Example)

Figure 13:
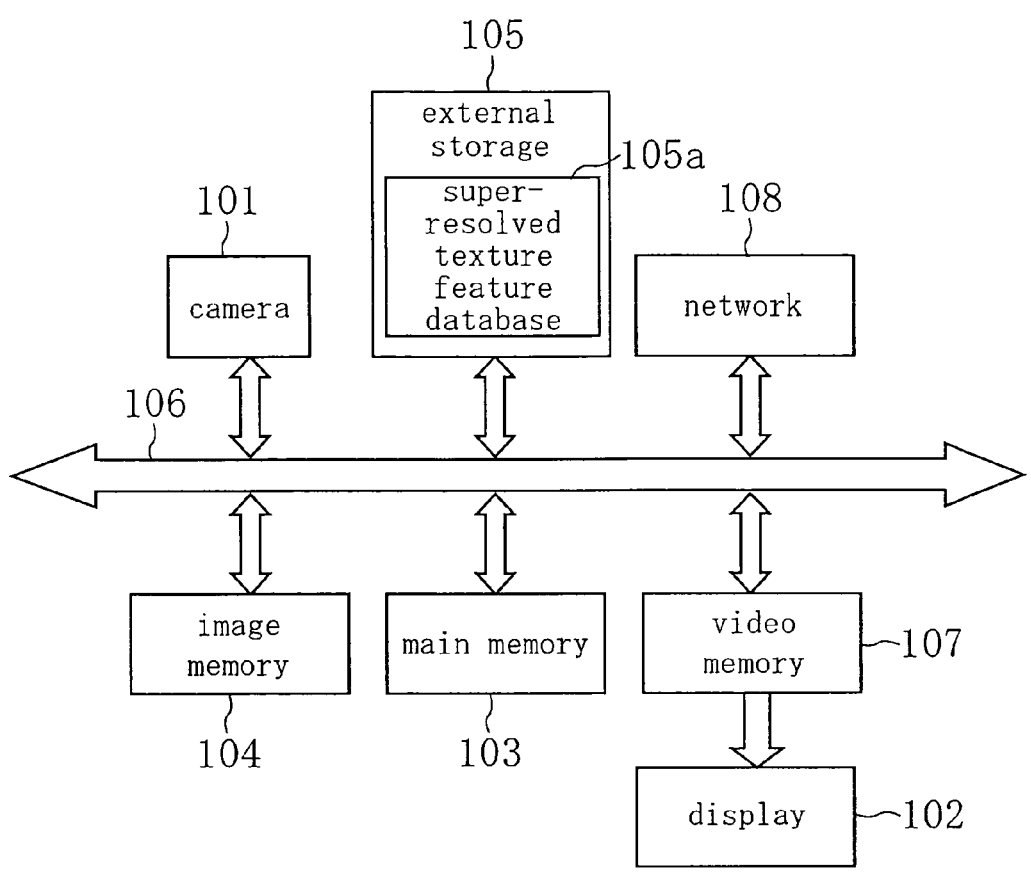
FIG. 13 is a drawing showing the first constitutional example of the present invention.

FIG. 13 shows the first constitution example as one example of the constitution for performing the image processing according to the present invention, using a personal computer. The resolution of a camera 101 is lower than the resolution of a display 102, and a super-resolution image is generated by an image processing program according to the present invention loaded in a main memory 103 in order to make the most out of the display ability of the display 102. A low-resolution image captured by the camera 101 is recorded in an image memory 104. A super-resolved texture feature database 105a is structured in advance in an external storage 105 so as to be referenced from the image processing program in the main memory 103. The image processing program in the main memory 103 reads the low-resolution image in the image memory 104 through a memory bus 106, converts it to a high-resolution image according to the resolution of the display 102, and then, transfers it to a video memory 107 through the memory bus 106 gain. The high-resolution image transferred to video memory 107 is displayed on the display 102 to be seen. Wherein, the operation of the image processing program, the content and the structuring method of the database, and the like are any of the details mentioned in the above embodiments and the description thereof is omitted.

It is noted that the present invention is not limited to the constitution of FIG. 13, and various constitutions are employable. For example, the super-resolved texture feature database 105a may be referenced through a network 108 from an external storage connected to another personal computer. Further, the low-resolution image may be obtained through the network 108.

(Second Constitution Example)

Figure 14:
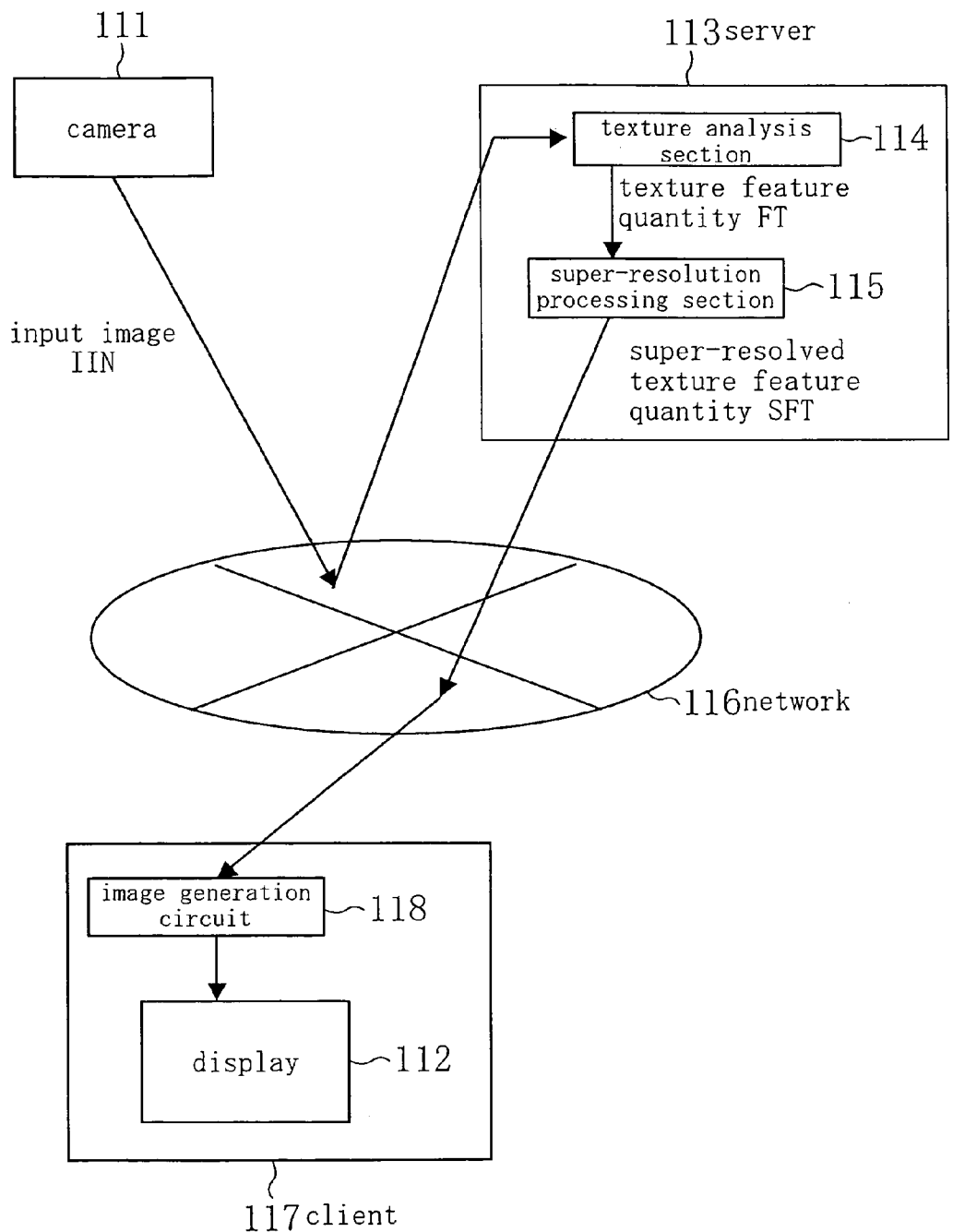
FIG. 14 is a drawing showing the second constitutional example of the present invention.

FIG. 14 shows the second constitution example as one example of the constitution for performing the image processing according to the present invention, using a server-client system. The resolution of a camera 111 is lower than the resolution of a display 112, and the super-resolution processing is executed in the server-client system in order to make the most out of the display ability of the display 112. A server 113 includes a texture analysis section 114 and a super-resolution processing section 115, and super-resolves the texture feature quantity FT of the input image IIN to send the result as a super-resolved texture feature quantity SFT to a client 117 through a network 116. The client 117 visualizes the received super-resolved texture feature quantity SFT in an image generation circuit 118, and displays the thus obtained super-resolution image on the display 112. Wherein, the texture analysis, the super-resolution processing, the content and the structuring method of the super-resolved texture feature database, and the like are any of the details mentioned in the above embodiments and the description thereof is omitted.

It is noted that the present invention is not limited to the constitution of FIG. 14, and various constitutions are employable. For example, the camera 111 may be a part of the client 117.

(Third Constitution Example)

Figure 15:
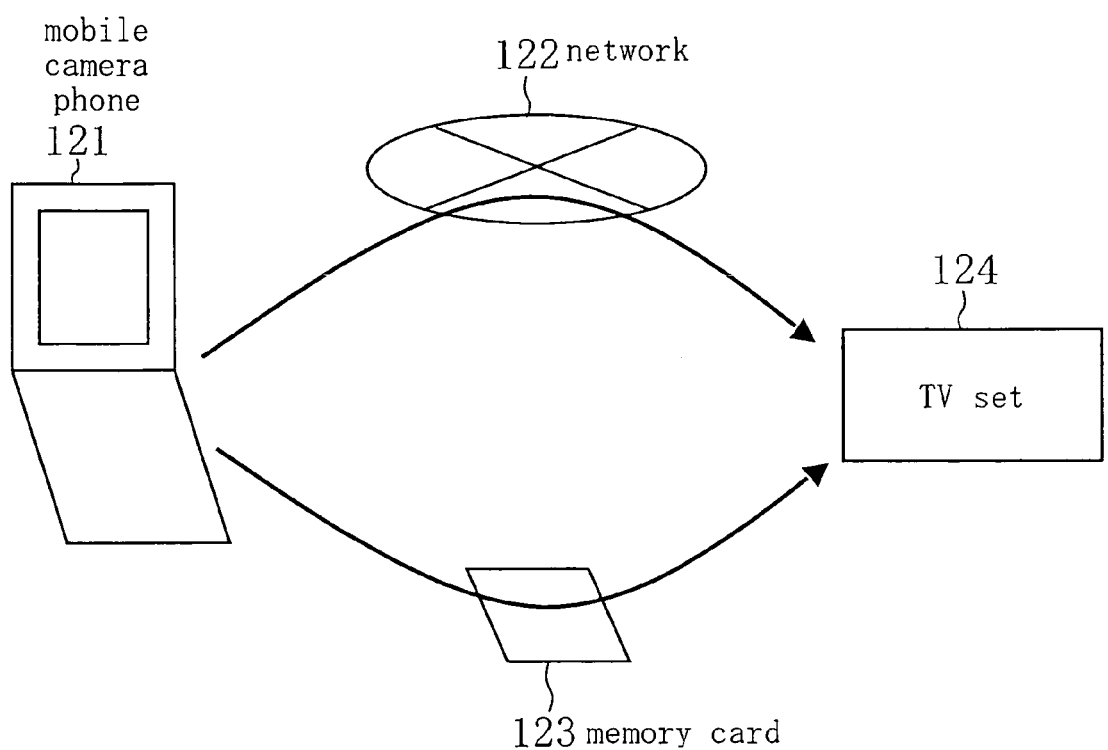
FIG. 15 is a drawing showing the third constitutional example of the present invention.

FIG. 15 shows the third constitution example as one example of the constitution for performing the image processing according to the present invention using a mobile camera phone and a TV set. A mobile camera phone 121 is capable of sending image data to a TV set 124 through a network 122 or a memory card 123. The resolution of the mobile camera phone 121 is lower than the resolution of the TV set 124. In order to make the most out of the display ability of the TV set 124, a super-resolution image is generated through a texture feature quantity analysis circuit, a super-resolved texture feature database, and an image generation circuit, which are boarded on an internal circuit of the TV set, and then, is displayed on the screen. Wherein, the details of the texture feature quantity analysis, the super-resolved texture feature database, and image generation are any of the details mentioned in the above embodiments and the description thereof is omitted.

It is noted that the present invention is not limited to the constitution of FIG. 15, and various constitutions are employable. For example, the mobile camera phone 121 may be a digital still camera or a video movie camera.

As described above, the present invention is applicable to general video equipment, such as mobile camera phones, digital still cameras, video movie cameras, TV sets, in addition to personal computers and server-client systems, which are all widespread, and requires none of special equipment, operation, management, and the like. Further, the present invention imposes no limitation on exclusive hardware implementation, combination of software and hardware, and the like, specifically system building method, the aspects of equipment connection, the internal construction of the equipment and the like.

The present invention, which generates images having increased information content with no degradation of the image feature, can be utilized in various application fields in which visual information content is placed prime importance on, and various effects are obtained. For example, detailed information on merchandise on which a consumer focuses attention can be presented in the electronic commerce; precise details of exhibits can be presented accurately to viewers in digital archives; an ability of video expression in video production is enhanced; and compatibility with various video formats is ensured in broadcast.

What is claimed is:

1. An image processing method of increasing information content of an original image to generate a densified image, comprising:
   a first step of performing spatial frequency analysis or time frequency analysis for the original image to obtain frequency response as an image feature quantity;
   a second step of
   (a) preparing in advance a densified image feature database by classifying plural densified image feature quantities which are obtained from sample densified images into image feature categories based on similarity, summing the classified densified image feature quantities every image feature category into single densified image feature quantity and storing the each summed densified image feature quantity into the densified image feature database,
   (b) selecting the image feature category with a highest similarity with the image feature quantity obtained in the first step by comparing the image feature quantity obtained in the first step with the each densified image feature quantity stored in the densified image feature database within a frequency band where the image feature quantity in the first step has component, and
   (c) reading out a densified image feature quantity for the selected image feature category from the densified image feature database; and
   a third step of generating, by subjecting the densified image feature quantity obtained in the second step to inverse transform to the first step, the densified image.

2. The image processing method of claim 1, wherein spatial frequency response or time frequency response is obtained using Fourier transform.

3. The image processing method of claim 1, wherein spatial frequency response or time frequency response is obtained using wavelet transform.

4. The image processing method of claim 1, wherein spatial frequency response or time frequency response is obtained using a plurality of spatial filters of which at least one of scale, phase, and spatial directionality is different from each other.

5. An image processing apparatus for increasing information content of an original image to generate a densified image comprising:
   an image feature analysis section that performs spatial frequency analysis or time frequency analysis for the original image to obtain frequency response as an image feature quantity;
   an information densification section that
   (a) selects an image feature category with a highest similarity with the image feature quantity obtained in the first step by comparing the image feature quantity obtained in the first step with each densified image feature quantity stored in a densified image feature database within a frequency band where the image feature quantity in the first step has component,
   the densified image feature database being prepared in advance by classifying plural densified image feature quantities which are obtained from sample densified images into image feature categories based on similarity, summing the classified densified image feature quantities every image feature category into single densified image feature quantity and storing the each summed densified image feature quantity into the densified image feature database, and
   (b) reads out a densified image feature quantity for the selected image feature category from the densified image feature database; and
   an image generation section that generates, by subjecting the densified image feature quantity obtained by the information densification section to inverse transform to the image feature analysis section, the densified image.

6. An image processing program embodied on a computer readable medium for increasing information content of an original image to generate a densified image, that allows a computer to execute:
   a first step of performing spatial frequency analysis or time frequency analysis for original image to obtain frequency response as an image feature quantity;
   a second step of
   (a) preparing in advance a densified image feature database by classifying plural densified image feature quantities which are obtained from sample densified images into image feature categories based on similarity, summing the classified densified image feature quantities every image feature category into single densified image feature quantity and storing the each summed densified image feature quantity into the densified image feature database,
   (b) selecting the image feature category with a highest similarity with the image feature quantity obtained in the first step by comparing the image feature quantity obtained in the first step with the each densified image feature quantity stored in the densified image feature database within a frequency band where the image feature quantity in the first step has component, and
   (c) reading out a densified image feature quantity for the selected image feature category from the densified image feature database; and
   a third step of generating, by subjecting the densified image feature quantity obtained in the second step to inverse transform to the first step, the densified image.

7. An image processing method of increasing information content of an original image to generate a densified image, comprising:
   a first step of performing spatial frequency analysis or time frequency analysis for the original image to obtain frequency response as an image feature quantity;
   a second step of
   (a) preparing in advance a texture feature database by calculating image feature quantity from sample images every combination of material property and resolution and storing the calculated image feature quantity into the texture feature database,
   (b) storing in advance pair of image feature quantities for same pixels of images with same material property and different resolution into a texture feature vector conversion table,
   (c) selecting the combination of material property and resolution with a highest similar image feature quantity with the image feature quantity obtained in the first step by comparing the image feature quantity obtained in the first step with the each image feature quantity stored in the texture feature database, and
   (d) reading out, with reference to the texture feature vector conversion table based on the selected material property and resolution, and resolution according to increase of information content, image feature quantity for combination of the selected material property and the resolution according to increase of information content as a densified image feature quantity; and a third step of generating, by subjecting the densified image feature quantity obtained in the second step to inverse transform to the first step, the densified image.

8. The image processing method of claim 7, wherein spatial frequency response or time frequency response is obtained using Fourier transform.

9. The image processing method of claim 7, wherein spatial frequency response or time frequency response is obtained using wavelet transform.

10. The image processing method of claim 7, wherein spatial frequency response or time frequency response is obtained using a plurality of spatial filters of which at least one of scale, phase, and spatial directionality is different from each other.

\* \* \* \* \*